(12) United States Patent
Pazner

(10) Patent No.: US 8,473,407 B2
(45) Date of Patent: *Jun. 25, 2013

(54) SYSTEM AND METHOD FOR DETERMINING IMPLIED MARKET INFORMATION

(71) Applicant: Trading Technologies International, Inc., Chicago, IL (US)

(72) Inventor: Assaf Pazner, Chicago, IL (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/674,609

(22) Filed: Nov. 12, 2012

(65) Prior Publication Data

US 2013/0066764 A1   Mar. 14, 2013

Related U.S. Application Data

(63) Continuation of application No. 13/323,324, filed on Dec. 12, 2011, now Pat. No. 8,332,309, which is a continuation of application No. 12/941,992, filed on Nov. 8, 2010, now Pat. No. 8,099,355, which is a continuation of application No. 12/464,388, filed on May 12, 2009, now Pat. No. 7,870,063, which is a continuation of application No. 11/415,452, filed on May 1, 2006, now Pat. No. 7,548,882, which is a continuation of application No. 10/403,374, filed on Mar. 31, 2003, now Pat. No. 7,765,134.

(60) Provisional application No. 60/424,179, filed on Nov. 5, 2002.

(51) Int. Cl.
*G06Q 40/00* (2012.01)

(52) U.S. Cl.
USPC ............................................................ 705/37

(58) Field of Classification Search
USPC ................................................. 705/36 R, 37
See application file for complete search history.

(56) References Cited

U.S. PATENT DOCUMENTS

| 5,812,988 | A  | 9/1998  | Sandretto      |
| 6,003,018 | A  | 12/1999 | Michaud et al. |
| 6,078,904 | A  | 6/2000  | Rebane         |
| 6,772,132 | B1 | 8/2004  | Kemp, II et al.|
| 6,938,011 | B1 | 8/2005  | Kemp, II et al.|
| 7,039,610 | B2 | 5/2006  | Morano et al.  |
| 7,127,424 | B2 | 10/2006 | Kemp, II et al.|

(Continued)

OTHER PUBLICATIONS

Regression Analysis Webpage [online], Wikipedia, Jan. 4, 2007. Retrieved from the Internet: http://en.wikipedia.org/wiki/Ordinary_least_squares_regression.

*Primary Examiner* — Susanna M Meinecke Diaz
(74) *Attorney, Agent, or Firm* — McDonnell Boehnen Hulbert & Berghoff LLP

(57) ABSTRACT

Implied prices and their quantities are computed. Markets are characterized by exhaustively computing one or more combinations of other related markets. Each combination when summed in a particular way results in the market under consideration. In a described embodiment, the number of market combinations found is an exhaustive list of market combinations such that the market under consideration can be fully and completely characterized, such that each combination provides implied market information about the market under consideration. Implied market information can include implied prices and their quantities, which are computed for each combination and used accordingly in displays or used by automated or semi-automated trading tools.

19 Claims, 6 Drawing Sheets

U.S. PATENT DOCUMENTS

| | | |
|---|---|---|
| 7,162,447 B1 | 1/2007 | Cushing |
| 7,228,289 B2 | 6/2007 | Brumfield et al. |
| 7,389,268 B1 | 6/2008 | Kemp, II et al. |
| 7,437,325 B2 | 10/2008 | Kemp, II et al. |
| 7,548,882 B1 | 6/2009 | Pazner |
| 7,765,134 B1 | 7/2010 | Pazner |
| 7,865,418 B2 | 1/2011 | Uenohara et al. |
| 7,870,063 B1 | 1/2011 | Pazner |
| 8,019,673 B1 | 9/2011 | Rooney |
| 8,099,355 B2 | 1/2012 | Pazner |
| 8,332,309 B2 * | 12/2012 | Pazner ............... 705/37 |
| 2003/0200167 A1 | 10/2003 | Kemp, II et al. |
| 2005/0192886 A1 | 9/2005 | Wender |
| 2007/0198387 A1 | 8/2007 | Uenohara et al. |
| 2011/0055069 A1 | 3/2011 | Pazner |
| 2012/0116941 A1 | 5/2012 | Pazner |

* cited by examiner

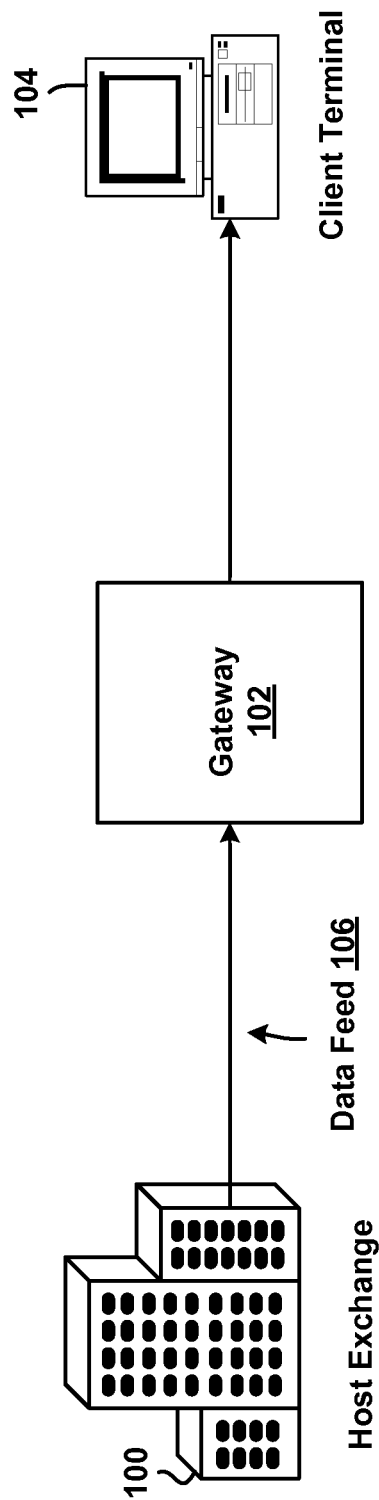

MARKET FOR TRADABLE OBJECT B

| Bid | Price | Ask |
|---|---|---|
|  | 125 |  |
|  | 120 |  |
|  | 115 | 1 |
| 5 | 110 |  |
|  | 105 |  |
|  | 100 |  |
|  | 95 |  |
|  | 90 |  |
|  | 85 |  |
|  | 80 |  |
|  | 75 |  |

FIG. 3

MARKET FOR TRADABLE OBJECT A

| Bid | Price | Ask |
|---|---|---|
|  | 150 |  |
|  | 140 |  |
|  | 130 |  |
|  | 120 |  |
|  | 110 | 7 |
| 3 | 100 |  |
|  | 90 |  |
|  | 80 |  |
|  | 70 |  |
|  | 60 |  |
|  | 50 |  |

FIG. 2

IMPLIED OUT MARKET FOR TRADABLE OBJECT B

| Bid | Price | Ask |
|---|---|---|
|  | 125 | 1 |
|  | 120 |  |
|  | 115 |  |
|  | 110 |  |
|  | 105 |  |
| 2 | 100 |  |
|  | 95 |  |
|  | 90 |  |
|  | 85 |  |
|  | 80 |  |
|  | 75 |  |

FIG. 5

IMPLIED IN MARKET FOR TRADABLE OBJECT AB

| Bid | Price | Ask |
|---|---|---|
|  | 60 |  |
|  | 45 |  |
|  | 30 |  |
|  | 15 |  |
|  | 0 | 5 |
| 1 | -15 |  |
|  | -30 |  |
|  | -45 |  |
|  | -60 |  |
|  | -75 |  |
|  | -90 |  |

FIG. 4

| Market | Bid Qty | Bid Price | Ask Price | Ask Qty |
|---|---|---|---|---|
| L1 | 200 | 96.86 | 96.87 | 200 |
| L2 | 100 | 96.8 | 96.81 | 100 |
| L3 | 500 | 94.9 | 95 | 300 |
| S1 | 100 | 0.05 | 0.06 | 100 |
| S2 | 100 | 1.8 | 1.87 | 100 |
| S3 | 0 | 0 | 1.97 | 100 |
|  |  |  |  |  |
| Implied |  |  |  |  |
| L1 = L2 + S1 | 100 | 96.85 | 96.87 |  |
| L1 = L2 + S2 - S3 |  | 98.6 | 96.71 | 100 |
| L1 = L3 + S1 + S3 |  | 94.95 | 97.03 |  |
| L1 = L3 + S2 |  | 96.7 | 96.87 |  |
| Merged Implied L1 | 100 | 96.85 | 96.71 | 100 |
|  |  |  |  |  |
| L2 = L1 - S1 | 100 | 96.81 | 96.81 | 100 |
| L2 = L1 - S2 + S3 |  | 95.06 | 96.97 |  |
| L2 = L3 - S1 + S2 |  | 96.65 | 96.81 | 0 |
| L2 = L3 + S3 |  | 94.9 | 96.97 |  |
| Merged Implied L2 | 100 | 96.81 | 96.81 | 100 |
|  |  |  |  |  |
| L3 = L1 - S1 - S3 | 0 | 96.81 | 94.84 | 100 |
| L3 = L1 - S2 | 100 | 95.06 | 95 |  |
| L3 = L2 + S1 - S2 |  | 95.05 | 95 |  |
| L3 = L2 - S3 | 0 | 96.8 | 94.84 | 0 |
| Merged Implied L3 | 100 | 95.06 | 94.84 | 100 |
|  |  |  |  |  |
| S1 = L1 - L2 | 100 | 0.06 | 0.06 |  |
| S1 = L1 - L3 - S3 | 0 | 1.96 | -0.1 | 100 |
| S1 = -L2 + L3 + S2 |  | -0.1 | 0.06 |  |
| S1 = S2 - S3 | 0 | 1.8 | -0.1 | 0 |
| Merged Implied S1 | 100 | 0.06 | -0.1 | 100 |
|  |  |  |  |  |
| S2 = L1 - L3 | 100 | 1.96 | 1.87 | 100 |
| S2 = L1 - L2 + S3 |  | 0.06 | 2.03 |  |
| S2 = L2 - L3 + S1 |  | 1.95 | 1.87 | 0 |
| S2 = S1 + S3 |  | 0.05 | 2.03 |  |
| Merged Implied S2 | 100 | 1.96 | 1.87 | 100 |
|  |  |  |  |  |
| S3 = L2 - L3 |  | 1.9 | 1.81 | 100 |
| S3 = -L1 + L2 + S2 |  | 1.74 | 1.81 | 0 |
| S3 = L1 - L3 - S1 | 100 | 1.91 | 1.81 | 0 |
| S3 = -S1 + S2 |  | 1.75 | 1.81 | 100 |
| Merged Implied S3 | 100 | 1.91 | 1.81 | 200 |

FIG. 8

SYSTEM AND METHOD FOR DETERMINING IMPLIED MARKET INFORMATION

CROSS-REFERENCE TO RELATED APPLICATIONS

This application is a continuation of U.S. patent application Ser. No. 13/323,324 filed Dec. 12, 2011, now U.S. Pat. No. 8,332,309, which is a continuation of U.S. patent application Ser. No. 12/941,992 filed Nov. 8, 2010, now U.S. Pat. No. 8,099,355, which is a continuation of U.S. patent application Ser. No. 12/464,388 filed May 12, 2009, now U.S. Pat. No. 7,870,063, which is a continuation of U.S. patent application Ser. No. 11/415,452 filed May 1, 2006, now U.S. Pat. No. 7,548,882, which is a continuation of U.S. patent application Ser. No. 10/403,374 filed Mar. 31, 2003, now U.S. Pat. No. 7,765,134, which claims the benefit of U.S. Provisional Application Ser. No. 60/424,179 filed on Nov. 5, 2002, entitled "System and Method For Determining Implied Market Information," the contents of which are fully incorporated herein by reference.

FIELD OF INVENTION

The present invention is directed towards electronic trading. More specifically, the present invention is directed towards a system and method for determining implied market information.

BACKGROUND

Trading methods have evolved from a manually intensive process to a technology enabled, electronic platform. With the advent of electronic trading, a user or trader can be in a virtually direct contact with the market, from practically anywhere in the world, performing near real-time transactions, and without the need to make personal contact with a broker.

Electronic trading is generally based on a host exchange, one or more computer networks, and client devices. In general, the host exchange includes one or more centralized computers to form the electronic heart. Its operations typically include order matching, maintaining order books and positions, price information, and managing and updating a database that records such information. The host exchange is also equipped with an external interface that maintains uninterrupted contact to the client devices and possibly other trading-related systems.

Using client devices, market participants or traders link to the host exchange through one or more networks. A network is a group of two or more computers or devices linked together. There are many types of wired and wireless networks such as local area networks and wide area networks. Networks can also be characterized by topology, protocol, and architecture. For example, some market participants may link to the host through a direct connection such as a T1 or ISDN. Some participants may link to the host exchange through direct connections and through other common network components such as high-speed servers, routers, and gateways. The Internet, a well-known collection of networks and gateways, can be used to establish a connection between the client device and the host exchange. There are many different types of networks and combinations of network types known in the art that can link traders to the host exchange.

Regardless of the way in which a connection is established, software running on the client devices allows market participants to log onto one or more exchanges and participate in at least one market. A client device is a computer such as a personal computer, laptop computer, hand-held computer, and so forth that has network access. In general, client devices run software that creates specialized interactive trading screens. Trading screens enable market participants to obtain market quotes, monitor positions, and submit orders to the host.

Generally, when an order is submitted to a host exchange, the host checks the conditions associated with the order, for example price and quantity, and prioritizes the order with other orders of the same price. When the order conditions are satisfied in the market, a trade occurs and trade information is then relayed in some fashion to one or more client devices. In fact, the host exchanges typically publish a data feed to the client devices so that the traders can have access to the most current market information.

Market information commonly includes information related to the inside market and market depth. The inside market is the lowest sell price in the market and the highest buy price in the market at a particular point in time. Market depth refers to a quantity available at the inside market and can refer to quantity available at other prices away from the inside market. The quantity available at a given price level is usually provided by the host exchange in aggregate sums. In other words, a host exchange usually provides the total buy or the total sell quantity available in the market at a particular price level in its data feed. The extent of the market depth available to a trader usually depends on the host exchange. For instance, some host exchanges provide market depth for an infinite number of price levels, while some provide only quantities associated with the inside market, and others may provide no market depth at all. Additionally, host exchanges can offer other types of market information such as the last traded price (LTP), the last traded quantity (LTQ), and order fill information.

Some traders prefer to trade only one tradable object at a time, and sometimes traders wish to trade more than one tradable object at a time which is a strategy often referred to as spreading or strategy trading. When a trader traders one tradable object, a trader might trade the June 2002 corn contract, for example. That is, the trader is offering to buy or willing to sell the corn contract, depending on his or her trading strategy. Likewise, a trader might trade the December 2003 corn contract. Some traders, however, trade more than one tradable object at a time. For example, a trader might want to spread trade the June 2002 corn contract and the December 2003 corn contract, such as buying the June corn contract and selling the December corn contract, or vice versa. Spreading can also be done based on other relationships besides calendar months. One such example would be trading a 10-year note and a 5-year note. According to these examples given above, the spread has two legs. Legs refer to the portions of the trades associated with each individual tradable object, which is also referred to as an outright market. For example, the June/December corn calendar spread has two legs, the June corn market makes up a leg and the December corn market makes up the other leg.

Spreads or strategies can have more than two legs. For example, a well-known strategy called the butterfly involves buying a near month contract, selling two middle month contracts, and buying a far month contract. An example might be buying 1 March corn contract, selling 2 June corn contracts, and buying 1 December corn contract. The butterfly strategy in this example has three legs. The March corn market makes up one leg, the June corn market makes up a second leg, and the December corn market makes up a third leg.

There are many other types of well-known strategies, besides the butterfly, having more than two legs.

Whether or not a trader decides to trade one or more tradable objects, it often becomes useful to see as many buy and/or sell orders as possible for each particular market. For example, when trading in a particular market, it is useful to see every direct order (e.g., the order's quantity and price) that is in the market, but it is also useful to see every order that has been implied into the market. An implied order is made up of an implied price and its implied quantity. Implied prices and quantities are derived from direct orders in a combination of outright markets and spreads/strategies. For example, orders in outright markets may imply orders (referred to as an "implied in" orders) into a spread market, and orders in a spread market plus orders in an outright market may imply orders (referred to as an "implied out" orders) into another outright market.

The LIFFE CONNECT™ Trading Host provided by a well-known exchange, LIFFE, calculates some implied "in" and implied "out" prices and quantities for its products, and in particular, for simple two-legged spreads and their legs. The LIFFE CONNECT™ Trading Host may use the implied prices and their quantities it calculated, in addition to using direct prices and quantities, to match incoming orders. The LIFFE CONNECT™ Trading Host, however, does not provide information relating to the implied in prices and quantities to traders, even though it considers them when checking for matches. LIFFE does not provide such information because it can use up much needed network bandwidth. Consequently, a trader can end up matching against these "invisible" quantities.

Although the LIFFE CONNECT™ Trading Host provides a better solution than earlier matching systems since it calculates and uses some of the implied prices and quantities in its matching algorithm, it still lacks the sophistication to exhaust every or nearly early opportunity of finding more implied prices and quantities. Further, because the LIFFE system does not provide implied data to traders, the traders are not able to take advantage of the implied data being used at the exchange.

With the advent of electronic exchanges, it is becoming more desirable to utilize tools that assist a trader in adapting his or her strategy to an electronic marketplace, and to help the participant make desirable trades. It is also becoming more desirable to improve matching engines so that traders can get the best prices for their trades and increase liquidity. What is needed, then, is a way for determining all (or most) possible prices and quantities in a market, whether they are direct or implied.

DETAILED DESCRIPTION OF THE DRAWINGS

FIG. 1 is an example of a network configuration for a communication system utilized to access one or more exchanges;

FIG. 2 illustrates inside market information associated with a first tradable object A that can be used to imply prices and quantities in a strategy market;

FIG. 3 illustrates inside market information associated with a second tradable object B that can be used imply prices and quantities in the strategy market;

FIG. 4 illustrates implied-in prices and quantities for the strategy market based on related markets as used in accordance with one example embodiment;

FIG. 5 illustrates implied-out prices and their quantities as used in accordance with one example embodiment;

FIG. 8 illustrates a table of implied prices and their quantities which were obtained by using example embodiments described herein.

DETAILED DESCRIPTION OF THE PREFERRED EMBODIMENT(S)

Overview

Figure 6:
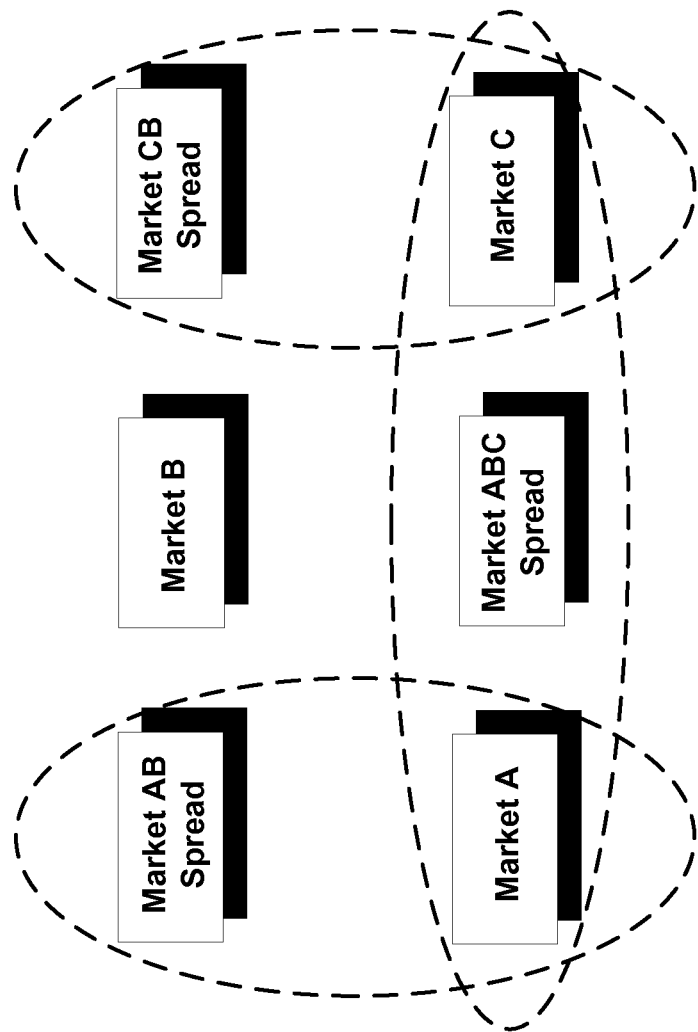
FIG. 6 illustrates possible market combinations that imply prices and quantities into one example market, designated as market B.

A system and related methods for computing implied prices and quantities are described. The system preferably characterizes a market by exhaustively computing one or more combinations of other related markets such that the markets of each combination when summed would result in the market under consideration. This results in having one or more combinations or equations that describe the same market in preferably a different and independent way. Preferably, the number of market combinations found is an exhaustive list of market combinations such that the market under consideration can be completely characterized, if so programmed. Then, each combination can provide implied market information about the market under consideration. Implied market information can include implied prices and their quantities, which are computed for each combination and used accordingly to characterize the market. In the preferred embodiment, the combinations are computed one time and stored for later use. The already determined combinations or equations can then be used to calculate implied prices and quantities.

Implied prices and their implied quantities are useful at trading terminals. By having such information that completely characterizes the market (e.g., direct orders, implied orders, or both direct and implied orders) made available and/or displayed at the trading terminals, the trader (or trading-related software applications) can make better decisions about a particular trading strategy. This can lead to better prices and greater liquidity for the trader.

Implied prices and quantities are useful at a host exchange. By having available information that completely characterizes the market (e.g., direct orders, implied orders, or both direct and implied orders) at the host exchange, the matching engine can match orders at improved prices or can add liquidity to certain tradable objects or strategies.

Although using implied prices and quantities can be beneficial at a trading terminal, a matching engine, or some other trading related device, computing the actual implied prices and their quantities can be performed on any computer or electronic device, which is preferably coupled to the trading terminal or matching engine through one or more networks. Therefore, it should be understood that the present embodiments including the process of determining implied prices and/or their implied quantities can be accomplished on the client device, on a computer at the electronic exchange, or on any other computer capable of processing information to produce a desired result such as a gateway or server. If implied prices and their quantities are computed at a gateway, for example, they can be published to client devices coupled to the gateway over one or more networks.

These aspects of the present embodiments and other aspects will become readily apparent to one skilled in the art from the following description. Furthermore, there are many advantages to computing implied prices and/or quantities, too numerous to mention here, but which will also become apparent to one of ordinary skill in the art with the following description.

Hardware and Software Overview

FIG. 1 is a block diagram that illustrates an electronic trading system 100 in accordance with the preferred embodiment in which implied prices and quantities may be calculated. The system 100 includes at least one host exchange 102 and one or more client devices 104. Intermediate devices such as gateways, routers, and other such types of network devices may be used to assist the client device 104 and host exchange 102 in communicating over network(s) 106. Intermediate devices, additional host exchanges, and additional client devices are not shown in FIG. 1 for sake of clarity. It should be understood, however, that other types of network configurations known in the art may be used as the system 100.

A. Host Exchange

The host exchange 102 may include, for example, the London International Financial Futures and Options Exchange ("LIFFE"), the Chicago Board of Trade ("CBOT"), the New York Stock Exchange ("NYSE"), the Chicago Mercantile Exchange ("CME"), the Exchange Electronic Trading ("Xetra") (a German stock exchange), or the European Exchange ("Eurex"). The host exchange 102 might also refer to other systems, from basic to more complex systems, which automatically match incoming orders. These example host exchanges and other host exchanges are well known in the art. Communication protocols required for connectivity to one of these host exchanges are also well known in the art.

As described in the background, a host exchange can implement numerous types of order execution algorithms. The present invention can work with any particular order execution algorithm, and therefore the present invention should not be limited to any type of order execution algorithm. However, for sake of illustration, some example order execution algorithms include first-in-first-out and pro rata algorithms. The first-in-first-out (FIFO) algorithm, used by Eurex for example, gives priority to the first person to place an order. Another algorithm, the pro rata algorithm, for example, takes into account each book order at the inside market price according to its percentage of the overall volume bid or offer at that price level, regardless of its time stamp, thus, avoiding an imbalance in priority between orders with small and large quantities.

Regardless of the type of order execution algorithm used, each host exchange including the host exchange 102 preferably provides similar types of information to the subscribing client devices 104. The information that the host exchange 102 provides is referred to hereinafter as market information. Market information may include data that represents just the inside market, where the inside market is the lowest sell price (best offer or best ask) and the highest buy price (best bid) at a particular point in time. The market information 108 may also include market depth. Market information can contain other types of market information such as the last traded price (LTP), the last traded quantity (LTQ), and/or order fill information. The contents of market information are generally up to the host exchange 102.

As previously described, the preferred embodiment may be used to trade any tradable object. As used herein, the term "tradable object," refers simply to anything that can be traded with a quantity and/or price. It includes, but is not limited to, all types of tradable objects such as financial products, which can include, for example, stocks, options, bonds, futures, currency, and warrants, as well as funds, derivatives and collections of the foregoing, and all types of commodities, such as grains, energy, and metals. The tradable object may be "real", such as products that are listed by an exchange for trading, or "synthetic", such as a combination of real products that is created by the user. A tradable object could actually be a combination of other tradable object, such as a class of tradable objects.

B. Client Device

In the preferred embodiment, the client device 104 is a computer that provides an interface to trade at the host exchange 102. An example client device is a personal computer, laptop computer, hand-held computer, and so forth. The client device 104, according to the preferred embodiment, includes at least a processor and memory. The processor and memory, which are both well-known computer components, are not shown in the figure for sake of clarity. Memory may include computer readable medium. The term computer readable medium, as used herein, refers to any medium that participates in providing instructions to processor for execution. Such a medium may take many forms, including but not limited to, non-volatile media, volatile media, and transmission media. Non-volatile media includes, for example, optical or magnetic disks, such as a storage device. Volatile media may include dynamic memory, such as main memory or RAM (random access memory). Common forms of computer-readable media include, for example, a floppy disk, a flexible disk, a hard disk, a magnetic tape, or any other magnetic medium, a CD-ROM, any other optical medium, punch cards, paper tape, any other physical medium with patterns of holes, a RAM, a PROM, and EPROM, a FLASH-EPROM, and any other memory chip or cartridge, or any other medium from which a computer can read.

In the preferred embodiment, the client device 104 receives market information 108 from the host exchange 102. The market information is received over the network(s) 106. The network(s) 106 may include a group of computers and/or associated devices that are connected by communications facilities, and can involve permanent connections, such as cables, or temporary connections made through telephone or other communication links. The network(s) 106 can be as small as a LAN (local area network) consisting of a few computers, printers, and other devices, or it can consist of many small and large computers distributed over a vast geographic area (WAN or wide area network), or it can consist of both types of networks (both LAN and WAN).

According to the preferred embodiment, market information is displayed to the trader on the client device 104. Preferably, the market information, or a portion thereof, is arranged using techniques described herein and is displayed on the visual output device or display device of the client device 104. The output device can be any type of display. For example, the display could be a CRT-based video display, an LCD-based or a gas plasma-based flat-panel display, or some other type of display. The present invention is not limited to any type of display.

Upon viewing market information or a portion thereof, a trader may wish to send transaction information to the host exchange 102. To do so, the trader may input the transaction information into the client device by typing into a keyboard, through a mouse, or some other input device. Preferably, transaction information includes an order to buy or an order to sell a tradable object. An order generally has two parameters, price and quantity, but the present invention is not limited to a particular number of parameters that may be used to characterize the order. According to another embodiment, transaction information might also refer to other order related transactions such as delete order messages, cancel and replace messages, and so forth. There are many different types of messages and order types that can be submitted to the host exchange 102, all of which are considered various types of transaction information. Then, transaction information is sent from the client device 104 to the host exchange 102 over the network(s) 106.

As previously described, FIG. 1 provides an example system overview according to one embodiment. Various changes and/or modifications may be made to the system and still fall within the scope of the present invention. For example, it should be understood that the present invention is not limited to any particular network architecture or configuration such as described in FIG. 1. The present invention may be applied with utility on any electronic device in any network that can be used for electronic trading. Further, as mentioned in reference to the preceding paragraphs any network entity such as the client device 104, the host exchange 100, the gateway 102, or any other network entity in communication with one of the devices may calculate implied quantities and prices according to methods described below.

Implied in Example

According to one embodiment, implied quantities and implied prices may be calculated from information associated with direct orders in a combination of outright markets that imply orders into a spread market, also commonly referred to as "implied in" orders. For example, using three tradable objects A, B, and C, the tradable objects can imply orders into three spread markets. Specifically, a tradable object AB may be a first spread strategy having the tradable object A as a first leg and the tradable object B as a second leg. A tradable object AC may be a second spread strategy having the tradable object A as a first leg, and the tradable object C as a second leg. Finally, a tradable object BC may be a third spread strategy having the tradable object B as a first leg, and the tradable object C as a second leg.

When an exchange provides a spread, the exchange may provide a relationship between two or more tradable objects that form the spread. For example, the following relationships may be used for the spreads described above:

$$\text{Spread } AB = \text{Leg } A - \text{Leg } B \quad \text{EQN (1)}$$

$$\text{Spread } AC = \text{Leg } A - \text{Leg } C \quad \text{EQN (2)}$$

$$\text{Spread } BC = \text{Leg } B - \text{Leg } C \quad \text{EQN (3)}$$

Further, each equation above may be used to generate two separate equations, one for buying and one for selling a spread. For example, using the first spread equation, the following buy and sell definitions may be derived:

$$\text{Buy } AB = \text{Buy } A - \text{Sell } B \quad \text{EQN (4)}$$

$$\text{Sell } AB = \text{Sell } A - \text{Buy } B \quad \text{EQN (5)}$$

The relationships in EQNs. (4) and (5) may then be used to calculate bid (buy) and ask (sell) implied quantities and prices. FIG. 2 is a graphical interface displaying inside market information associated with a first tradable object A being traded on a first exchange. The inside market represents the highest buy price and the lowest sell price. As shown, there is a bid quantity of 3 at a price of 100, and there is an ask quantity of 7 at a price of 110. In FIG. 2, we can assume that the bid and ask orders are direct, meaning that the orders were placed directly on the market associated with the first tradable object.

FIG. 3 is a graphical interface displaying inside market information associated with a second tradable object B. As shown there is a bid quantity of 5 at a price of 110, and there is an ask quantity of 1 at a price of 115. Also, similarly to FIG. 2, we can assume that orders associated with the tradable object B were directly placed into market. The orders associated with the tradable object A and tradable object B can imply orders into a spread tradable object AB. FIG. 4 illustrates implied prices and implied quantities for a spread AB having the tradable object A as a first leg and the tradable object B as a second leg. The implied prices for the spread AB can be calculated using EQNs. (4) and (5) above. As shown, there is an implied bid quantity of 1 at a price of −15, and an implied ask quantity of 5 at a price of 0.

It should be understood that if quantities at price levels other than the inside market are available, implied prices and implied quantities for the spread AB may be calculated for quantities at those price levels as well. Using EQN. (4), the price to buy the spread AB may be found: 100−115, which is −15. In this example, the quantity at the price −15 is the minimum of the quantities 3 and 1, which is 1. It should be understood that the minimum of the quantities is used because once a quantity associated with the second leg is used up, there is no quantity left to match the quantity of 2 remaining in the first leg. Similarly, using EQN (5), a price to sell the spread AB is found: 110−110=0. In this example, the implied ask quantity is 5 based on the minimum of the two quantities 7 and 5 associated with the two legs of the spread AB. Referring to FIG. 4, the computed implied quantities and prices are shown for the spread AB.

According to the preferred embodiments, tradable objects are expressed in a vector notation. To do this, it is preferable to express a market associated with each tradable object as an identity vector, such that the tradable object A=(1,0,0), tradable object B=(0,1,0), and spread of tradable objects AB=(0,0,1). In the illustrated embodiment, each vector is of the same size, where the size of the vector corresponds to the number of tradable objects in the set. In this example, there are three tradable objects so that each vector has three dimensions. Also, strategy markets with two or more legs can be also expressed as a definition vector. For example, buying spread AB can be also defined as (1,−1,0), which means buying a tradable object A and selling a tradable object B. In such an embodiment, selling the spread AB can be defined as (−1,1,0), which means selling the tradable object A and buying the tradable object B.

Implied Out Example

An implied out occurs when there are orders in one or more outright markets and in a strategy market, e.g., a spread market, such that these markets imply out prices and quantities to another outright market. EQN (1) has been rearranged to get: B=A−AB. Then, the following relationships are determined:

$$\text{Buy } B = \text{Buy } A - \text{Sell } AB \quad \text{EQN (6)}$$

$$\text{Sell } B = \text{Sell } A - \text{Buy } AB \quad \text{EQN (7)}$$

Using EQN (6) and EQN (7), prices and their quantities from AB and A can be implied into market B. Referring to the example described in reference to FIG. 2, there is a bid quantity of 2 left at a price of 100 (because the bid quantity of 1 was used to imply the bid quantity into the AB spread in FIG. 4), and there is an ask quantity of 2 left at a price of 110 (because the sell quantity of 5 was used to imply the ask quantity into the AB spread). Based on the remaining quantities for the tradable object A (2@100, and 2@110), and the quantities in the outright market associated with the spread AB, the implied bid quantity in the market of the tradeable object is 2 at a price level of 100. Using EQN (6), a price of the bid quantity of the tradable object is found: 100−0=100, and the quantity is the minimum of the quantities 2 and 5. Using EQN (7), a price of the ask quantity of the tradable object is found: 110−(−15)=125, and the quantity is the minimum of the quantities 2 and 1. FIG. 5 illustrates implied out quantities for the tradable object B. As shown in FIG. 5, there is an implied bid quantity of 2 at a price of 100, and an implied ask quantity of 1 at a price of 125.

Further, it should be understood that instead of using implied in prices and quantities of the market associated with the spread AB, the equations for the implied out market associated with the tradable object B may be rearranged so that direct prices and quantities are used instead of the implied ones. For example, EQN (5) (Sell AB=Sell A−Buy B) may be substituted into EQN (6), so that EQN (6) becomes:

$$\text{Buy } B = \text{Buy } A - \text{Sell } A + \text{Buy } B \quad \text{EQN (8)}$$

It should be understood that the Buy B on the right hand side of EQN (8) corresponds to the direct market, and the Buy B on the left hand side of EQN (8) corresponds to the implied out price.

Using direct prices of the tradable objects A and B illustrated in FIGS. 2 and 3, the implied out price for the buy quantity is 100 (as in FIG. 5). Similarly, EQN (4) (Buy AB=Buy A−Sell B) may be substituted into EQN (7), so that EQN (7) becomes:

$$\text{Sell } B = \text{Sell } A - \text{Buy } A + \text{Sell } B \quad \text{EQN (9)}$$

As in EQN (8), the Sell B on the right hand side of the EQN (9) corresponds to the direct market, and the Sell B on the left hand side of EQN (9) corresponds to the implied out market.

Using direct prices for the tradable objects A and B, the implied out price for the sell quantity is 125 (as shown in FIG. 5). However, it should be understood that orders could also be directly placed in the market associated with the spread AB.

EQN (1) can also be rearranged to get: A=AB+B. Then, the following relationship can be determined:

$$\text{Buy } A = \text{Buy } AB + \text{Buy } B \quad \text{EQN (10)}$$

$$\text{Sell } A = \text{Sell } AB + \text{Sell } B \quad \text{EQN (11)}$$

EQN (10) and EQN (11) can then be used to determine implied prices and quantities for the tradable object using the markets associated with the tradable objects B and AB. However, since there is no quantity left for the tradable object B (the quantity was used up to imply quantity into the spread AB), there are no implied out quantities for the tradable object A. Different orders of equations that are used to calculate implied prices and quantities may yield different results in implied quantities. To solve for an optimal solution, as will be explained further below, the equations may be represented as a linear programming problem and may be solved using a linear method such as Simplex, for example.

Multiple Implied Prices and Maximum Implied Quantity

It should be understood that multiple implied prices may be calculated for the same tradable object based on different market combinations associated with tradable objects. For example, EQN (1) can be rearranged to get:

$$A = AB + B \quad \text{EQN (12)}$$

Then, EQN (3) can be rearranged to get B=BC+C, which, when substituted to EQN (12), gives:

$$A = C + AB + BC \quad \text{EQN (13)}$$

Further, EQN (2) can be rearranged to get C=A−AC, which, when substituted to EQN (13), gives:

$$A = B + AB - AC + BC \quad \text{EQN (14)}$$

Then, as explained earlier, each of EQNs (12), (13), and (14), can be used to determine implied bid and asks prices and quantities for the tradable object A. The following relationships can be determined for implied bid prices:

$$\text{Buy } A = \text{Buy } AB + \text{Buy } B \quad \text{EQN (15)}$$

$$\text{Buy } A = \text{Buy } C + \text{Buy } AB + \text{Buy } BC \quad \text{EQN (16)}$$

$$\text{Buy } A = \text{Buy } B + \text{Buy } AB - \text{Sell } AC + \text{Buy } BC \quad \text{EQN (17)}$$

Let's assume that the bid quantities at inside markets for the tradable objects B, C, AB, and BC are 1@90, 1@80, 1@10, and 1@10. Then, let's assume that the ask quantity at the inside market for the tradable object AC is 1@5. Using EQN. (15), there is an implied bid quantity of 1 at an implied price level of 100. Then, using EQN. (16), there is an implied bid quantity of 1 at an implied price level of 100, and using EQN. (17), there is an implied bid quantity of 1 at an implied price level of 105. Then, the best implied price, e.g., 105, in this example for the bid, may be selected as an implied price for the tradable object A.

However, if the bid quantity at the inside market for the tradable object AB were 1@85, then using EQNs. (15), (16), and (17), the implied quantities at prices would be 1@100, 1@105, and 1@105, respectively, which would imply the quantity of 2 rather than 1 at the best bid price of 105. When two or more equations provide the same implied price, the maximum or optimal implied quantity may be calculated to provide a user accurate quantity information at the calculated implied price level. Using the example above, when a trader buys one contract of the spread AB, the quantity in the bid quantity of the spread AB in EQN (15) and EQN (16) goes to 0, so that presenting the quantity of 2 for the implied best bid price of 105 would be inaccurate.

According to one method, the equations that are used to determine the bid/ask implied prices could also be used to determine the maximum implied quantity for each implied price. However, the order in which the equations are used may produce different results, and the quantities determined using such a method may be spread between a range of many quantities. Thus, such a method makes it difficult to select the quantity value that best represents the implied quantity for the implied price level. To avoid these problems and provide a trader with an optimal estimation of the available quantity at the implied price level, a linear optimization method may be used to determine a maximum quantity, the embodiment of which will be described hereinafter. It should be understood, and as mentioned in earlier paragraphs, that the optimization method may be used when two or more equations result in the same implied price or when the equation, when used in different orders, produce different implied quantities, for example. However, implied prices and quantities may be calculated using the optimization method in other scenarios as well.

According to one embodiment, a linear programming problem based on a formula or a linear function, often called an objective function, with a number of linear constraints, may be defined to determine the maximum or optimal implied quantity. The linear programming problem may then be solved using any linear program such as a simplex method or any other linear program. The simplex method is an algorithm (or a set of instructions) that determines a maximum value of a linear expression by examining corner points of one or more equations of the linear problem in an ordered manner until the highest or optimal value is found. However, it should be understood that any other method for determining the optimal implied quantity could also be used.

As explained in the preceding paragraphs, linear programming may be applied to a set of equations representing quantities that are available based on each equation that is used to calculate the implied prices. For example, the following equation, EQN. (18), may be used to determine a maximum quantity for the implied price, where each $s_i$ corresponds to an implied quantity determined based on each equation "i."

$$\text{Max} \sum_i^I s_i \quad \text{EQN (18)}$$

Further, EQN. (15) may be subject to one or more constraints such as the one illustrated with the following formula:

$$s \propto \sum_{i=1}^{I} q_{im} * s_i \leq q_m \ \forall \ m = 1 \ldots m \quad \text{EQN (19)}$$

In the formula illustrated in EQN (19), the summation goes across all equations starting with the first equation i=1 that is used to imply prices and quantities, until the last equation "I" is reached. Further, in the illustrated formula, "$q_{im}$" corresponds to the absolute value of a coefficient corresponding to "$m^{th}$" tradable object (or market) in the $i^{th}$ equation so that for example, in the equation A=B+2AB, $q_{01}$=1, and $q_{03}$=2, where markets corresponding to tradable objects A, B, C, AB, AC, and BC, map to subscripts 0, 1, 2, 3, 4, and 5, respectively.

Referring back to EQNs. (12), (13), and (14), and considering buys and sells associated with each equation as a separate market, the following formulas developed based on EQN. (19) may be generated for 12 markets (0-11), or for buys and sells corresponding to each of 6 tradable objects (A, B, C, AB, AC, and BC):

$$M0 \ 0*s_1+0*s_2+0*s_3 \leq 1 \quad \text{EQN (20)}$$

$$M1 \ 0*s_1+0*s_2+0*s_3 \leq 1 \quad \text{EQN (21)}$$

$$M2 \ 1*s_1+0*s_2+1*s_3 \leq 1 \quad \text{EQN (22)}$$

$$M3 \ 0*s_1+0*s_2+0*s_3 \leq 1 \quad \text{EQN (23)}$$

$$M4 \ 0*s_1+1*s_2+0*s_3 \leq 1 \quad \text{EQN (24)}$$

$$M5 \ 0*s_1+0*s_2+0*s_3 \leq 1 \quad \text{EQN (25)}$$

$$M6 \ 1*s_1+1*s_2+1*s_3 \leq 1 \quad \text{EQN (26)}$$

$$M7 \ 0*s_1+0*s_2+0*s_3 \leq 1 \quad \text{EQN (27)}$$

$$M8 \ 0*s_1+0*s_2+0*s_3 \leq 1 \quad \text{EQN (28)}$$

$$M9 \ 0*s_1+0*s_2+1*s_3 \leq 1 \quad \text{EQN (29)}$$

$$M10 \ 0*s_1+1*s_2+1*s_3 \leq 1 \quad \text{EQN (30)}$$

$$M11 \ 0*s_1+0*s_2+0*s_3 \leq 1 \quad \text{EQN (31)}$$

For example, EQN. (20) corresponds to the buy of the tradable object A. Since A is not a variable in any of the EQNs. (12)-(14), the coefficients "q" for each of $s_1$-$s_3$ are zeroes. EQN. (21) corresponds to the ask equation for the tradable object A; however, since there is no A in any of the EQNs. (12)-(14), the coefficients once again are zeroes. Referring now to the buy equation associated with the B tradable object (M2) in EQN. (22), the "q" coefficients for $s_1$ and $s_3$ are "1" since B is part of EQN. (12) and EQN. (14) corresponding to $s_1$ and $s_3$, respectively. Referring now to EQN. (29) for the ask market associated with the tradable object AC, the "q" coefficient associated with $s_3$ is an absolute value of the negative coefficient (where negative indicates the ask activity) in EQN. (14). Coefficients in other equations are determined in the same manner. Further, $q_m$ for each of the EQNs. (20)-(31) is 1, because $q_m$ corresponds to a direct quantity that is available for market m.

EQNs. (20)-(31) may then be solved using a linear algorithm, such as a simplex algorithm, to determine the maximum $s_i$ implied quantity. It should be understood, however, than a different or equivalent linear optimization method may be used to solve the equations for the maximum implied quantity.

Multiple Combinations of Markets

The above examples (implied in and implied out) illustrated in FIGS. 2-5, involved two markets including two outright markets and a spread between them. When an exchange has multiple related markets, some of which are outright markets and some of which are spreads, the number of combinations increases. FIG. 6 illustrates one example market, designated as market B that has multiple combinations, which can imply prices into it. As shown in FIG. 6, the markets include market AB, market A, market B, market ABC, market CB, and market C. Market AB is a spread between markets A and B. Market ABC is a spread between markets A, B, and C. Market CB is a spread between markets C and B. This example shows that prices and quantities can be implied into the outright market B from the circled combinations of markets. For example, one combination is market AB and market A that when summed in a particular way will result in a market B. Another combination is market CB and market C that when summed will result in a market B. A third combination is market ABC, market A, and market C that when summed will result in a market B. As a result, in this example there are, at least, four market possibilities for market B. Each of the four market possibilities shown may provide similar implied market information, but it is also possible that each of the market possibilities provide different implied market information as explained above. For purposes of illustration only, the example shown in FIG. 6 uses a set of six markets and shows only four market combinations for market B. However, there are many other possible combinations for market B that were not shown for sake of clarity in this example, but are shown in later examples.

Representing Markets in Vector Notation

According to the preferred embodiment, to determine many possible combinations that a market may have, it becomes more efficient to represent the markets using a vector notation. Then, using various techniques, such as generating equations by solving and substituting that will be described below, the combinations of markets can be determined, and from those combinations implied prices and their implied quantities can be determined. Vector notation allows a computer to swiftly calculate combinations and implied prices/quantities. This computer processing efficiency is especially advantageous if implied prices and their quantities are computed after every market price/quantity update occurs.

Figure 7:
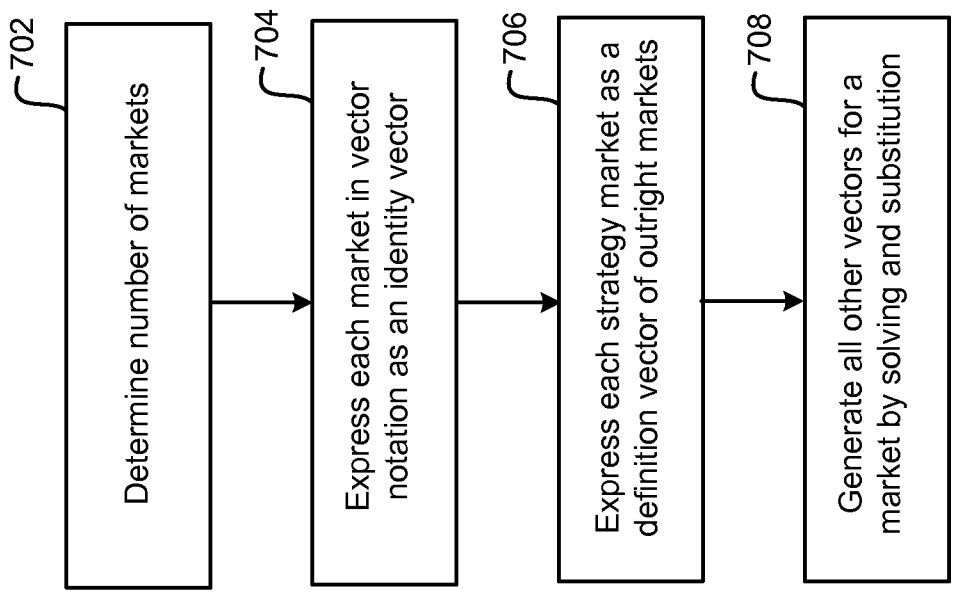
FIG. 7 is a flow chart that illustrates an example process for representing markets by market combinations using vector notation.

FIG. 7 is a flow chart that illustrates an example process for representing all (or nearly all, depending on when the process is ended) combinations that equate to every market in a set of markets as vectors. For sake of illustration, the process is described with respect to an example; however, it should be understood that the process is not limited to any particular example used herein. Assume that six related markets include a July contract (L1), September contract (L2), and a December contract (L3), and the spreads include a July/September spread (S1), a September/December spread (S2), and a July/December spread (S3). The set of markets includes market L1, market L2, market L3, market S1, market S2, and market S3. The set of markets generally consists of related markets and can be chosen manually or automatically. However, any number of related markets can be used. As previously mentioned, the various markets do not have to be hosted at the same exchange, but the markets could be hosted at a plurality of different exchanges.

In step 702, a total number of markets is determined. In this example, there is a total of six markets. Preferably, the size of the vectors will be equal to the total number of markets. For example, a vector used in this example might be of the dimension six or equivalently the vector might be represented in the following form: (0,0,0,0,0,0). However, it should be understood that the number of markets can be higher or lower, as will be described further below.

In the preferred embodiment, the number of markets in a set of markets is based on information provided by the exchange. For example, an exchange provides the system with information on L1, L2, and L3 in its data feed. Some time later, however, a new market, S1, might emerge that has legs L1 and L2. Preferably, the exchange provides the system with information that the new market S1 is now available to trade. Then, the system (or exchange) can relate markets L1, L2, and S1 together and follow the procedure described herein to calculate implied prices and their quantities. This process of detecting new markets and relating them to other markets preferably occurs throughout the process of calculating implieds, because markets can come and go throughout the trading day. Sometimes, markets are no longer available. Therefore, it is preferable to detect which markets are no longer available to trade and remove them from the set of markets, which are under consideration. If this occurs, the combinations or equations that have variables representing the market(s) that no longer exist can be removed from the set of equations; the embodiment of which is described further below.

In step 704, preferably each market is expressed as an identity vector. Buying in a market is positive and selling in a market is negative. Quantities are coefficients of the vector. According to the ongoing example, the markets can be characterized as a set of first vectors: Market L1=(1,0,0,0,0,0), market L2=(0,1,0,0,0,0), and market L3=(0,0,1,0,0,0), market S1=(0,0,0,1,0,0), market S2=(0,0,0,0,1,0), and market S3=(0,0,0,0,0,1).

In step 706, preferably each strategy is expressed as a definition of the outright markets (e.g., L1, L2, and L3) to form a set of second vectors. This can be performed using EQN (1) or some form thereof. For the example, S1=L1−L2= (1,−1,0,0,0,0), S2=L2−L3=(0,1,−1,0,0,0), and S3=L1−L3= (1,0,−1,0,0,0).

In step 708, all other vector combinations are generated. According to the preferred embodiment, all other vector combinations are computed by solving for vector combinations to generate a set of third vectors (such as L1=S1−L2), and then substituting various third vector combinations into second vectors (such as substituting L1=S1−L2 into L1 associated with S3=L1−L3) to generate even more combinations. The process of solving and substituting is described below, and an example is provided using the six related markets L1, L2, L3, S1, S2, and S3 to further illustrate the process of solving and substituting. As a general overview of the preferred embodiment, when an equation is found, it is substituted into all of the equations that have already been accepted. So, for example, imagine a growing group of accepted equations (e.g., identity vectors, definitional vectors, etc.) and when a new equation is found, it is substituted into the already accepted equations to form more equations, some of which are accepted and some of which are rejected. The equations that are accepted are added to this growing group of accepted equations. Preferably, this process continues until preferably most, if not all, of the combinations are found. This process is described more below.

Solving for Vectors

Solving for vectors includes rearranging definition vectors so that designated variables (markets) are isolated. For example, in the above example, the definition vectors included: S1=L1−L2, S2=L1−L3, and S3=L2−L3. Those definition vectors can be rearranged to solve for L1, L2, and L3. Looking first to S1, the following relationships can be found:

$$L1=S1+L2 \quad \text{EQN (32)}$$

$$L2=L1-S1 \quad \text{EQN (33)}$$

Looking next to S2, the following relationships can be found:

$$L1=S2+L3 \quad \text{EQN (34)}$$

$$L3=L1-S2 \quad \text{EQN (35)}$$

Looking next to S3, the following relationships can be found:

$$L2=S3+L3 \quad \text{EQN (36)}$$

$$L3=L2-S3 \quad \text{EQN (37)}$$

In a preferred embodiment, to find the above relationships using vector notation, the identity vector for each strategy is set equal to the definition vector for each strategy and then the relationships given by EQN (32) through EQN (37) are solved. For example, S1=L1−L2⇒(0,0,0,1,0,0)=(1,−1,0,0,0, 0). To solve for EQN (32), for example:

$$L1=S1+L2 \Rightarrow$$
$$(0,1,0,1,0,0)=(0,0,0,1,0,0)+-1(0,-1,0,0,0,0) \quad \text{EQN (38)}$$

$$L1=(0,1,0,1,0,0)=(0,0,0,1,0,0)+(0,1,0,0,0,0) \quad \text{EQN (39)}$$

On paper it might look simple to calculate L1 in terms of S1 and S2 as shown in EQN (38), however this is not necessarily true for a computer. Thus, according to the preferred embodiment, to solve for L1 in sequential steps, the first number of the definition vector is zeroed out because it corresponds to L1, which is being solved for. The zeroed out L1 is shown by looking first to the vector (1,−1,0,0,0,0) in which after the L1 is zeroed becomes the vector (0,−1,0,0,0,0), which is found in EQN (38). If the number which is being zeroed out is a positive value, then the vector is multiplied by a negative value (negated). If the number which is being zeroed out is a negative value, then the sign of the vector remains the same. Because the first number of the definition vector in this example is a positive value, the definition vector is multiplied by a negative one value (or negated). As a result of negating the definition vector by −1*(0,−1,0,0,0,0), EQN (39) is determined, in which L1 is computed by summing the identity vectors for both S1 and L2. This is done for L2 also, illustrated in the following equations. For example, S1=L1−L2⇒(0,0, 0,1,0,0)=(1,−1,0,0,0,0). To solve for EQN (33), for example:

$$L2=L1-S1 \Rightarrow$$
$$(1,0,0,-1,0,0)=(1,0,0,0,0,0)-(0,0,0,1,0,0) \quad \text{EQN (40)}$$

$$L2=(1,0,0,-1,0,0)=(1,0,0,0,0,0)+(0,0,0,-1,0,0) \quad \text{EQN (41)}$$

EQN (34) through EQN (37) can be solved for in the same fashion to get:

$$L1=S3+L3=(0,0,1,0,0,1)=(0,0,0,0,0,1)+(0,0,1,0,0,0) \quad \text{EQN (42)}$$

$$L3=L1-S3=(1,0,0,0,0,-1)=(1,0,0,0,0,0)+(0,0,0,0,0,-1) \quad \text{EQN (43)}$$

$$L2=S2+L3=(0,0,1,0,1,0)=(0,0,0,0,1,0)+(0,0,1,0,0,0) \quad \text{EQN (44)}$$

$$L3=L2-S2=(0,1,0,-1,0,0)=(0,1,0,0,0,0)+(0,0,0,-1,0,0) \quad \text{EQN (45)}$$

As the equations are determined, they may be grouped. For instance, so far, the following accepted combinations or equations shown in vector notation have been found:

| | | |
|---|---|---|
| L1 = (1, 0, 0, 0, 0, 0) | L2 = (0, 1, 0, 0, 0, 0) | L3 = (0, 0, 1, 0, 0, 0) |
| L1 = (0, 1, 0, 1, 0, 0) | L2 = (1, 0, 0, −1, 0, 0) | L3 = (0, 1, 0, −1, 0, 0) |
| L1 = (0, 0, 1, 0, 0, 1) | L2 = (0, 0, 1, 0, 1, 0) | L3 = (1, 0, 0, 0, 0, −1) |
| S1 = (0, 0, 0, 1, 0, 0) | S2 = (0, 0, 0, 0, 1, 0) | S3 = (0, 0, 0, 0, 0, 1) |
| S1 = (1, −1, 0, 0, 0, 0) | S2 = (0, 1, −1, 0, 0, 0) | S3 = (1, 0, −1, 0, 0, 0) |

According to an embodiment, the step of generating all other vectors for a market may be stopped at this point, or any other point before this phase, for that matter. The time at which the step of generating other vectors is stopped can depend on how many combinations the system is programmed to find (or the number of iterations the system is programmed to perform). For example, sometimes a few computed implied prices and their quantities (few generations of implieds) are enough to satisfy a trader and his or her trading strategy. However, more combinations can be found by substitution, an example process of which is described below.

Vector Substitution

Substitution includes substituting those equations that were determined from the solving process into other equations such as the identity vectors, definitional vectors, and so on. This process may continue indefinitely resulting in equations that are dependent and independent from each other, but the process can be stopped at some point in time. The point at which the process is stopped, according to one embodiment, is described below. Preferably, the independent equations are used to determine implied prices and their quantities, while the dependent equations are rejected as it generally means that the same equation, in at least its basic form, already exists.

Using the equations solved in the above example, the process of substitution can be demonstrated. For example, EQN (32) can be substituted into the definitional vector: S1=L1−L2, which would give: S1=(L2+S1)−L2=S1. This, however results in a dependent equation because EQN (8) was derived from the definitional vector. If EQN (34) is substituted into the same definitional vector, then S1=L1−L2 results in: S1=(L3+S2)−L2=L3+S2−L2. This results in an independent equation and therefore can be used as a combination. The equation can also be written in a vector notation as S1=(0,−1,1,0,1,0). This equation also illustrates the concept of implied on implied. That is, EQN (34) gives an implied price and its implied quantity. By substituting EQN (10) into S1, the resulting equation, S1=(L3+S2)−L2=L3+S2−L2, gives an implied price and an implied quantity based in part at least on another implied price and implied quantity.

The process of substitution can be repeated until the process is stopped or until no new (or independent) vectors are generated. Equations from the process of substitution can be first generation implied equations (e.g., definitional vectors can be considered first generation implied equations), or they can be of second generation implied equations (such as shown in the example above), or they can be of multiple-generation implied equations such that the equation is based on equations which have to be implied from other implied equations. The system preferably characterizes each market (e.g., L1, L2, L3, S1, S2, and S3) by exhaustively computing one or more of the equations or combinations of other related markets such that the markets of each combination when summed would result in the market under consideration.

Using computer generated results, the following combinations have been found. They can be expressed in the following notation or in vector notation.

$L1=L2+S1$  $S1=L1−L3−S3$ $L1=L2+S2−S3$  $S1=−L2+L3+S2$ $L1=L3+S1+S3$  $S1=S2−S3$ $L1=L3+S2$ $L2=L1−S1$  $S2=L1−L2+S3$ $L2=L1−S2+S3$  $S2=L2−L3+S1$ $L2=L3−S1+S2$  $S2=S1+S3$ $L2=L3+S3$ $L3=L1−S1−S3$  $S3=−L1+L2+S2$ $L3=L1−S2$  $S3=L1−L3−S1$ $L3=L2+S1−S2$  $S3=−S1+S2$ $L3=L2−S3$

A computer generated list of combinations, including those combinations found above, are shown in Appendix A. The list provides a read-out of results obtained from executing software according to an embodiment using the six related markets above, but it should be understood that the present invention is not be limited to the example. For example, the present embodiment should not be limited to the number and/or type of markets used in the example (e.g., more or fewer markets be used, different types of markets can be used), it should not be limited to the number of iterations performed to obtain the readout (e.g., more or fewer iterations can be performed), it should not be limited to the order of equations found (e.g., solving and substitution orders do not have to occur in the order shown), it should not be limited to determining if the candidate is accepted or rejected after each iteration (e.g., as shown in the read-out), and so on.

Once the combinations or equations are determined, they can be stored for future use to compute implied prices and their quantities. For example, they may be stored on a medium. Such a medium may take many forms, including but not limited to, non-volatile media, volatile media, and transmission media. Non-volatile media includes, for example, optical or magnetic disks, such as storage device. Volatile media includes dynamic memory, such as main memory or RAM (random access memory). Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, and any other memory chip or cartridge, or any other medium from which a computer can read.

Determining when a Vector is New

As mentioned above, the process of generating combinations or equations is preferably repeated until there are no more new combinations or equations. According to the preferred embodiment, the time at which the process is stopped is based on when there are no new equations being generated, however, this is described in another section below. Regardless of when the process is stopped, it is preferable that when a combination or equation is generated, it is checked against all previously accepted equations to determine if it is new or not. If it is a new equation, it is accepted and added to the list of accepted combinations, which are later used in calculating implied prices and their quantities. If it is not a new equation, it is rejected. In the preferred embodiment, there are at least two instances that the system looks for in determining whether the equation is new or not. In the first instance, if the first equation was found: A=B+C, and some time later the same equation, or a multiple, was found again (e.g., A=B+C, 2A=2B+2C, 3A=3B+3C, etc.) then the later equation (s) is rejected because it is not new in light of the first equation. In the second instance, assume that a first equation was found: A=B+C, and some time later another equation was found: A=B+C+D. The later equation is rejected, because the later equation "contains" (e.g., the first equation (A=B+C) is contained in the later equation (A=B+C)+D) so that the later equation must be thrown out as D is equal to 0 and/or the later equation cannot give a better price than the first equation, for example. Other techniques for determining whether an equation is new (e.g., independent from previously generated equations) or not (e.g., dependent from previously generated equations) could be used as well.

Stopping the Process of Determining Combinations

As seen directly above, to determine whether an equation is new or not, the most recent equation determined is compared in a manner to all of the previously accepted equations. If the most recent equation is a repeat of an already existing equation, it is rejected. In the preferred embodiment, the process is stopped when equations are simply repeating themselves or it is determined that equations are no longer independent from each other.

Determining Implied Prices and Quantities

Once a set of vectors (e.g., including combinations or equations) is found, implied prices can be determined from them. For example, using the generated strategies shown in Appendix A and shown below, implied prices can be calculated for each combination.

| | | |
|---|---|---|
| L1 = L2 + S1 | L2 = L1 – S1 | L3 = L1 – S1 – S3 |
| L1 = L2 + S2 – S3 | L2 = L1 – S2 + S3 | L3 = L1 – S2 |
| L1 = L3 + S1 + S3 | L2 = L3 – S1 + S2 | L3 = L2 + S1 – S2 |
| L1 = L3 + S2 | L2 = L3 + S3 | L3 = L2 – S3 |
| S1 = L1 – L2 | S2 = L1 – L3 | S3 = L2 – L3 |
| S1 = L1 – L3 – S3 | S2 = L1 – L2 + S3 | S3 = –L1 + L2 + S2 |
| S1 = –L2 + L3 + S2 | S2 = L2 – L3 + S1 | S3 = L1 – L3 – S1 |
| S1 = S2 – S3 | S2 = S1 + S3 | S3 = –S1 + S2 |

In the preferred embodiment, the best price for each market (e.g., L1, L2, . . . S3) is determined and then the quantity available at that price is determined. FIG. 8 shows a table of results which were obtained using combinations above and some sample market information. The sample market information might be received from data feeds from an exchange and includes:

| Market | Bid Qty | Bid Price | Ask Price | Ask Qty |
|---|---|---|---|---|
| L1 | 200 | 96.86 | 96.87 | 200 |
| L2 | 100 | 96.8 | 96.81 | 100 |
| L3 | 500 | 94.9 | 95 | 300 |
| S1 | 100 | 0.05 | 0.06 | 100 |
| S2 | 100 | 1.8 | 1.87 | 100 |
| S3 | 0 | 0 | 1.97 | 100 |

Looking to L1. The bid prices are preferably determined by substituting the appropriate market information into the determined equations. For example, L1=L2+S1=96.8+0.05=96.85; L1=L2+S2–S3=96.8+1.8–0=98.6; L1=L3+S1+S3=94.9+0.05+0=94.95; and L1=L3+S2=94.9+1.8=96.7. These prices are shown in FIG. 9 with respect to implied bid prices for L1. The same can be done for the implied ask prices for L1. According to the preferred embodiment, the best bid price, or equivalently, the highest bid price is determined from the implieds as 96.85. The best ask price, or equivalently, the lowest ask price is determine to be 96.71. Thus, market L2 and S1 imply the highest bid price for L1, and market L2, S2, and S3 imply the lowest ask price for L1.

Preferably, the available quantity is determined for the best prices. Looking to L1=L2+S1, it can be shown that L2 has a bid quantity of 100, and S1 has a bid quantity of 100. Taking the minimum of the markets (in this example they are equal at 100), the available quantity is 100. If L2 had only 30 available instead of 100 and S1 had 100, then the available quantity would only be 30 as only 30 can be supplied at a price of 96.85. Looking to L1=L2+S2–S3, it can be shown that L2 has an ask quantity of 100, S2 has an ask quantity of 100, and S3 has an ask quantity of 100. Taking the minimum of the markets (again, in this example they are all equal at 100), the available quantity is 100. As a result for L1, there is a bid quantity of 100 available at an implied price of 96.85 and there is an ask quantity of 100 available at an implied price of 96.71. This same process can be repeated for the remaining markets in this example, those remaining include L2, L3, S1, S2, and S3. The results of which are shown in FIG. 8.

Sometimes, there are combinations that provide the same implied price. Then, to determine the quantity available calls for looking at all quantities available from the combinations which result in the same price. For example, looking to L2, the best implied ask price is 96.81, in which case, two combinations share the same price result L2=L1–S1 and L2=L3–S1+S2. Preferably, though quantity cannot be used more than once, as has been described above. For example, the first equation is a function of L1 and S1, both of which imply a minimum quantity of 100. The second equation is a function of L3, S1, and S2. However, because quantity was "used up" by S1 in the first equation, it is no longer available for use in the second equation. Thus, the second equation yields 0 quantity and therefore does not imply any quantity. So, only L2=L1–S1 implies 100 at an ask price of 96.81. Another example where there is no quantity is shown with respect to the buy side of L3. The best price is 96.81, but no quantity is available for S3, so that price cannot be implied. The next best price is 96.8, but again no quantity is available for S3, so that price cannot be implied. The next best price is 95.06, which implies a quantity of 100.

In the examples directly above, quantity was used up or not available, but sometimes quantities from two or more combinations are added. For example, looking to S3, the best implied ask price is 1.81. This is achieved by all combinations. However, S3=L2–L3 implies a quantity of 100, whereas S3=–L1+L2+S2 and S3=L1–L3–S1 do not imply any quantities because they were used up in the first equation. However, S3=–S1+S2 implies a quantity of 100. Therefore, the total available quantity is 200 at an ask price of 1.81. Alternatively, optimization method, such as a linear method can be used to determine an optimum implied quantity as has been described above.

Display of Implied Prices and Quantities

As mentioned above, the best implied prices and quantities are preferably determined. According to the preferred embodiment, the calculation of implied prices and quantities are computed for every update that occurs in the market. Then, the implied prices are preferably displayed to the user, such as in the trading application display itself, to indicate to a user the implied quantities in the market. Preferably, the user has the option of turning on or off the display of implied quantities and prices. It is also envisioned that the user could display only the best prices between direct prices and implied prices, or show both the direct prices and the implied prices. However, the trading application could be programmed so that the user is not aware whether the price and quantities are implied or not.

CONCLUSION

Described herein is a system and related methods for computing implied prices and quantities. First, the system preferably characterizes a market by exhaustively computing one or more combinations of other related markets such that the markets of each combination when summed would result in the market under consideration. This step need only occur one time to generate the combinations or equations. Preferably, these combinations or equations are put into a vector notation form. The equations can be stored in a memory unit or on a disk such as described above. Once the equations are solved for, implied prices and quantities can be calculated over and over again. It is envisioned that the computation of equations and implied prices and quantities can occur on any computing device such as the client device and/or gateway.

Once the equations are determined, each combination can provide implied market information about the market under consideration. The implied market information can be used by the traders in any fashion to better assist them in trading. As described above, implied prices and their implied quantities are useful at trading terminals. Implied prices and quantities are also useful at a host exchange. By having available information that completely characterizes the market (e.g., direct orders, implied orders, or both direct and implied orders) at the host exchange, the matching engine can match orders at improved prices or can add liquidity to certain tradable objects or strategies.

It should also be understood that the present invention is not limited to any particular network architecture, but rather may be applied with utility on any electronic device in any network that can be used for electronic trading. Furthermore, the invention is not limited to a completely electronic trading environment where orders are sent to an electronic matching engine. For example, the invention could be utilized with an electronic trading application that automatically sends orders electronically to a terminal where a person (e.g., a floor broker) executes those orders in a traditional open outcry trading floor.

The foregoing description is presented to enable one of ordinary skill in the art to make and use the invention. Various modifications to the preferred embodiment will be readily apparent to those skilled in the art and the generic principles herein may applied to other embodiments. Therefore, it should be understood that the above description of the preferred embodiments, alternative embodiments, and specific examples are given by way of illustration and not limitation. Many changes and modifications, such as to the methods or system described herein, are within the scope of the present invention.

APPENDIX A

Below are some results from running software of the preferred embodiment on 6 related markets, three of which are outright markets and three of which are strategies. The results end with the possible combinations that can be used to imply prices and quantities. The combinations were used in FIG. 8 to imply prices and quantities. Note that as the combinations are determined, some are accepted and some are rejected.

```
{
L1 = L1
L2 = L2
L3 = L3
S1 = L1 - L2
S1 = S1
S2 = L1 - L3
S2 = S2
S3 = L2 - L3
S3 = S3
}
```

Generating . . .
Generated candidate by solving: L1=L1
Candidate rejected.
Generated candidate by solving: L2=L2
Candidate rejected.
Generated candidate by solving: L3=L3
Candidate rejected.
Generated candidate by solving: L1=L2+S1
Candidate accepted.
Generated candidate by solving: L2=L1−S1
Candidate accepted.
Generated candidate by solving: S1=S1
Candidate rejected.
Generated candidate by solving: L1=L3+S2
Candidate accepted.
Generated candidate by solving: L3=L1−S2
Candidate accepted.
Generated candidate by solving: S2=S2
Candidate rejected.
Generated candidate by solving: L2=L3+S3
Candidate accepted.
Generated candidate by solving: L3=L2−S3
Candidate accepted.
Generated candidate by solving: S3=S3
Candidate rejected.
Generated candidate by substituting: L1=L1
Candidate rejected.
Generated candidate by substituting: L1=L2+S1
Candidate rejected.
Generated candidate by substituting: L1=L3+S2
Candidate rejected.
Generated candidate by substituting: L1=L1
Candidate rejected.
Generated candidate by substituting: L1=L2+S1
Candidate rejected.
Generated candidate by substituting: L1=L3+S1+S3
Candidate accepted.
Generated candidate by substituting: L1=L1
Candidate rejected.
Generated candidate by substituting: L1=L2+S1
Candidate rejected.
Generated candidate by substituting: L1=L1
Candidate rejected.
Generated candidate by substituting: L1=L2+S2−S3
Candidate accepted.
Generated candidate by substituting: L1=L3+S2
Candidate rejected.
Generated candidate by substituting: L1=L1
Candidate rejected.
Generated candidate by substituting: L1=L3+S2
Candidate rejected.

Generated candidate by substituting: L2=L1−S1
Candidate rejected.
Generated candidate by substituting: L2=L2
Candidate rejected.
Generated candidate by substituting: L2=L3−S1+S2
Candidate accepted.
Generated candidate by substituting: L2=L2
Candidate rejected.
Generated candidate by substituting: L2=L1−S1
Candidate rejected.
Generated candidate by substituting: L2=L1−S1
Candidate rejected.
Generated candidate by substituting: L2=L2
Candidate rejected.
Generated candidate by substituting: L2=L3+S3
Candidate rejected.
Generated candidate by substituting: L2=L1−S2+S3
Candidate accepted.
Generated candidate by substituting: L2=L2
Candidate rejected.
Generated candidate by substituting: L2=L3+S3
Candidate rejected.
Generated candidate by substituting: L2=L2
Candidate rejected.
Generated candidate by substituting: L2=L3+S3
Candidate rejected.
Generated candidate by substituting: L3=L1=S2
Candidate rejected.
Generated candidate by substituting: L3=L2+S1−S2
Candidate accepted.
Generated candidate by substituting: L3=L3
Candidate rejected.
Generated candidate by substituting: L3=L3
Candidate rejected.
Generated candidate by substituting: L3=L1−S2
Candidate rejected.
Generated candidate by substituting: L3=L1−S1−S3
Candidate accepted.
Generated candidate by substituting: L3=L2−S3
Candidate rejected.
Generated candidate by substituting: L3=L3
Candidate rejected.
Generated candidate by substituting: L3=L3
Candidate rejected.
Generated candidate by substituting: L3=L2−S3
Candidate rejected.
Generated candidate by substituting: L3=L1−S2
Candidate rejected.
Generated candidate by substituting: L3=L2−S3
Candidate rejected.
Generated candidate by substituting: L3=L3
Candidate rejected.
Generated candidate by substituting: S1=L1−L2
Candidate rejected.
Generated candidate by substituting: S1=S1
Candidate rejected.
Generated candidate by substituting: S1=−L2+L3+S2
Candidate accepted.
Generated candidate by substituting: S1=S1
Candidate rejected.
Generated candidate by substituting: S1=L1−L2
Candidate rejected.
Generated candidate by substituting: S1=L1−L3−S3
Candidate accepted.
Generated candidate by substituting: S1=L1−L2
Candidate rejected.
Generated candidate by substituting: S1=S1
Candidate rejected.
Generated candidate by substituting: S2=L1−L3
Candidate rejected.
Generated candidate by substituting: S2=L2−L3+S1
Candidate accepted.
Generated candidate by substituting: S2=S2
Candidate rejected.
Generated candidate by substituting: S2=S2
Candidate rejected.
Generated candidate by substituting: S2=L1−L2+S3
Candidate accepted.
Generated candidate by substituting: S2=L1−L3
Candidate rejected.
Generated candidate by substituting: S2=L1−L3
Candidate rejected.
Generated candidate by substituting: S2=S2
Candidate rejected.
Generated candidate by substituting: S3=L1−L3−S1
Candidate accepted.
Generated candidate by substituting: S3=L2−L3
Candidate rejected.
Generated candidate by substituting: S3=S3
Candidate rejected.
Generated candidate by substituting: S3=−L1+L2+S2
Candidate accepted.
Generated candidate by substituting: S3=S3
Candidate rejected.
Generated candidate by substituting: S3=L2−L3
Candidate rejected.
Generated candidate by substituting: S3=L2−L3
Candidate rejected.
Generated candidate by substituting: S3=S3
Candidate rejected.
Generated candidate by substituting: L1=L1−S1+S2−S3
Candidate rejected.
Generated candidate by substituting: L1=L2+S2−S3
Candidate accepted.
Generated candidate by substituting: L1=L3+S2
Candidate rejected.
Generated candidate by substituting: L1=L1+L2−L3−S3
Candidate rejected.
Generated candidate by substituting: L1=L2+S2−S3
Candidate rejected.
Generated candidate by substituting: L1=L3+S2
Candidate rejected.
Generated candidate by substituting: L1=L2+S2−S3
Candidate rejected.
Generated candidate by substituting: L1=L1+S1−S2+S3
Candidate rejected.
Generated candidate by substituting: L1=L2+S1
Candidate rejected.
Generated candidate by substituting: L1=L3+S1+S3
Candidate accepted.
Generated candidate by substituting: L1=L1−L2+L3+S3
Candidate rejected.
Generated candidate by substituting: L1=L3+S1+S3
Candidate rejected.
Generated candidate by substituting: L1=L2+S1
Candidate rejected.
Generated candidate by substituting: L1=L3+S1+S3
Candidate rejected.
Generated candidate by substituting: L2=L1−S2+S3
Candidate accepted.
Generated candidate by substituting: L2=L2+S1−S2+S3
Candidate rejected.

Generated candidate by substituting: L2=L3+S3
Candidate rejected.
Generated candidate by substituting: L2=L3+S3
Candidate rejected.
Generated candidate by substituting: L2=L1−S2+S3
Candidate rejected.
Generated candidate by substituting: L2=L1+L2−L3−S2
Candidate rejected.
Generated candidate by substituting: L2=L1−S2+S3
Candidate rejected.
Generated candidate by substituting: L2=L1−S1
Candidate rejected.
Generated candidate by substituting: L2=L2−S1+S2−S3
Candidate rejected.
Generated candidate by substituting: L2=L3−S1+S2
Candidate accepted.
Generated candidate by substituting: L2=−L1+L2+L3+S2
Candidate rejected.
Generated candidate by substituting: L2=L3−S1+S2
Candidate rejected.
Generated candidate by substituting: L2=L1−S1
Candidate rejected.
Generated candidate by substituting: L2=L3−S1+S2
Candidate rejected.
Generated candidate by substituting: L3=L1−S1−S3
Candidate accepted.
Generated candidate by substituting: L3=L2−S3
Candidate rejected.
Generated candidate by substituting: L3=L3−S1+S2−S3
Candidate rejected.
Generated candidate by substituting: L3=L2−S3
Candidate rejected.
Generated candidate by substituting: L3=L1−S1−S3
Candidate rejected.
Generated candidate by substituting: L3=L1−L2+L3−S1
Candidate rejected.
Generated candidate by substituting: L3=L1−S1−S3
Candidate rejected.
Generated candidate by substituting: L3=L1−S2
Candidate rejected.
Generated candidate by substituting: L3=L2+S1−S2
Candidate accepted.
Generated candidate by substituting: L3=L3+S1−S2+S3
Candidate rejected.
Generated candidate by substituting: L3=L1−S2
Candidate rejected.
Generated candidate by substituting: L3=L2+S1−S2
Candidate rejected.
Generated candidate by substituting: L3=−L1+L2+L3+S1
Candidate rejected.
Generated candidate by substituting: L3=L2+S1−S2
Candidate rejected.
Generated candidate by substituting: S1=L1−L3−S3
Candidate accepted.
Generated candidate by substituting: S1=L2−L3+S1−S3
Candidate rejected.
Generated candidate by substituting: S1=S2−S3
Candidate accepted.
Generated candidate by substituting: S1=S2−S3
Candidate rejected.
Generated candidate by substituting: S1=L1−L2
Candidate rejected.
Generated candidate by substituting: S1=L1−L3−S3
Candidate rejected.
Generated candidate by substituting: S1=L1−L2
Candidate rejected.
Generated candidate by substituting: S1=L1−L3−S3
Candidate rejected.
Generated candidate by substituting: S1=−L1+L3+S1+S2
Candidate rejected.
Generated candidate by substituting: S1=−L2+L3+S2
Candidate accepted.
Generated candidate by substituting: S1=S2−S3
Candidate rejected.
Generated candidate by substituting: S1=L1−L2
Candidate rejected.
Generated candidate by substituting: S1=S2−S3
Candidate rejected.
Generated candidate by substituting: S1=−L2+L3+S2
Candidate rejected.
Generated candidate by substituting: S1=L1−L2
Candidate rejected.
Generated candidate by substituting: S1=−L2+L3+S2
Candidate rejected.
Generated candidate by substituting: S2=L1−L2+S3
Candidate accepted.
Generated candidate by substituting: S2=S1+S3
Candidate accepted.
Generated candidate by substituting: S2=−L2+L3+S2+S3
Candidate rejected.
Generated candidate by substituting: S2=S1+S3
Candidate rejected.
Generated candidate by substituting: S2=L1−L2+S3
Candidate rejected.
Generated candidate by substituting: S2=L1−L3
Candidate rejected.
Generated candidate by substituting: S2=L1−L3
Candidate rejected.
Generated candidate by substituting: S2=L1−L2+S3
Candidate rejected.
Generated candidate by substituting: S2=L1−L3
Candidate rejected.
Generated candidate by substituting: S2=L2−L3+S1
Candidate accepted.
Generated candidate by substituting: S2=S1+S3
Candidate rejected.
Generated candidate by substituting: S2=−L1+L2+S1+S2
Candidate rejected.
Generated candidate by substituting: S2=S1+S3
Candidate rejected.
Generated candidate by substituting: S2=L2−L3+S1
Candidate rejected.
Generated candidate by substituting: S2=L1−L3
Candidate rejected.
Generated candidate by substituting: S2=L2−L3+S1
Candidate rejected.
Generated candidate by substituting: S3=−L1+L2+S2
Candidate accepted.
Generated candidate by substituting: S3=−S1+S2
Candidate accepted.
Generated candidate by substituting: S3=L2−L3
Candidate rejected.
Generated candidate by substituting: S3=−S1+S2
Candidate rejected.
Generated candidate by substituting: S3=−L1+L2+S2
Candidate rejected.
Generated candidate by substituting: S3=−L1+L3+S2+S3
Candidate rejected.
Generated candidate by substituting: S3=L2−L3
Candidate rejected.
Generated candidate by substituting: S3=−L1+L2+S2
Candidate rejected.

Generated candidate by substituting: S3=L1−L3−S1
Candidate accepted.
Generated candidate by substituting: S3=L2−L3
Candidate rejected.
Generated candidate by substituting: S3=−S1+S2
Candidate rejected.
Generated candidate by substituting: S3=−S1+S2
Candidate rejected.
Generated candidate by substituting: S3=L1−L2−S1+S3
Candidate rejected.
Generated candidate by substituting: S3=L1−L3−S1
Candidate rejected.
Generated candidate by substituting: S3=L2−L3
Candidate rejected.
Generated candidate by substituting: S3=L1−L3−S1
Candidate rejected.
Generated candidate by substituting: L1=L1−S1+S2−S3
Candidate rejected.
Generated candidate by substituting: L1=L2+S2−S3
Candidate rejected.
Generated candidate by substituting: L1=L3+S2
Candidate rejected.
Generated candidate by substituting: L1=L1+L2−L3−S3
Candidate rejected.
Generated candidate by substituting: L1=L2+S2−S3
Candidate rejected.
Generated candidate by substituting: L1=L3+S2
Candidate rejected.
Generated candidate by substituting: L1=L2+S2−S3
Candidate rejected.
Generated candidate by substituting: L1=L1+S1−S2+S3
Candidate rejected.
Generated candidate by substituting: L1=L2+S1
Candidate rejected.
Generated candidate by substituting: L1=L3+S1+S3
Candidate rejected.
Generated candidate by substituting: L1=L1−L2+L3+S3
Candidate rejected.
Generated candidate by substituting: L1=L3+S1+S3
Candidate rejected.
Generated candidate by substituting: L1=L2+S1
Candidate rejected.
Generated candidate by substituting: L1=L3+S1+S3
Candidate rejected.
Generated candidate by substituting: L2=L1−S2+S3
Candidate rejected.
Generated candidate by substituting: L2=L2+S1−S2+S3
Candidate rejected.
Generated candidate by substituting: L2=L3+S3
Candidate rejected.
Generated candidate by substituting: L2=L3+S3
Candidate rejected.
Generated candidate by substituting: L2=L1−S2+S3
Candidate rejected.
Generated candidate by substituting: L2=L1+L2−L3−S2
Candidate rejected.
Generated candidate by substituting: L2=L1−S2+S3
Candidate rejected.
Generated candidate by substituting: L2=L1−S1
Candidate rejected.
Generated candidate by substituting: L2=L2−S1+S2−S3
Candidate rejected.
Generated candidate by substituting: L2=L3−S1+S2
Candidate rejected.
Generated candidate by substituting: L2=−L1+L2+L3+S2
Candidate rejected.
Generated candidate by substituting: L2=L3−S1+S2
Candidate rejected.
Generated candidate by substituting: L2=L1−S1
Candidate rejected.
Generated candidate by substituting: L2=L3−S1+S2
Candidate rejected.
Generated candidate by substituting: L3=L1−S1−S3
Candidate rejected.
Generated candidate by substituting: L3=L2−S3
Candidate rejected.
Generated candidate by substituting: L3=L3−S1+S2−S3
Candidate rejected.
Generated candidate by substituting: L3=L2−S3
Candidate rejected.
Generated candidate by substituting: L3=L1−S1−S3
Candidate rejected.
Generated candidate by substituting: L3=L1−L2+L3−S1
Candidate rejected.
Generated candidate by substituting: L3=L1−S1−S3
Candidate rejected.
Generated candidate by substituting: L3=L1−S2
Candidate rejected.
Generated candidate by substituting: L3=L2+S1−S2
Candidate rejected.
Generated candidate by substituting: L3=L3+S1−S2+S3
Candidate rejected.
Generated candidate by substituting: L3=L1−S2
Candidate rejected.
Generated candidate by substituting: L3=L2+S1−S2
Candidate rejected.
Generated candidate by substituting: L3=−L1+L2+L3+S1
Candidate rejected.
Generated candidate by substituting: L3=L2+S1−S2
Candidate rejected.
Generated candidate by substituting: S1=L1−L3−S3
Candidate rejected.
Generated candidate by substituting: S1=L2−L3+S1−S3
Candidate rejected.
Generated candidate by substituting: S1=S2−S3
Candidate rejected.
Generated candidate by substituting: S1=S2−S3
Candidate rejected.
Generated candidate by substituting: S1=L1−L2
Candidate rejected.
Generated candidate by substituting: S1=L1−L3−S3
Candidate rejected.
Generated candidate by substituting: S1=L1−L2
Candidate rejected.
Generated candidate by substituting: S1=L1−L3−S3
Candidate rejected.
Generated candidate by substituting: S1=−L1+L3+S1+S2
Candidate rejected.
Generated candidate by substituting: S1=−L2+L3+S2
Candidate rejected.
Generated candidate by substituting: S1=S2−S3
Candidate rejected.
Generated candidate by substituting: S1=L1−L2
Candidate rejected.
Generated candidate by substituting: S1=S2−S3
Candidate rejected.
Generated candidate by substituting: S1=−L2+L3+S2
Candidate rejected.
Generated candidate by substituting: S1=L1−L2
Candidate rejected.
Generated candidate by substituting: S1=−L2+L3+S2
Candidate rejected.

Generated candidate by substituting: S1=L1−L3−S3
Candidate rejected.
Generated candidate by substituting: S1=S2−S3
Candidate rejected.
Generated candidate by substituting: S1=−L2+L3+S2
Candidate rejected.
Generated candidate by substituting: S1=S2−S3
Candidate rejected.
Generated candidate by substituting: S2=L1−L2+S3
Candidate rejected.
Generated candidate by substituting: S2=S1+S3
Candidate rejected.
Generated candidate by substituting: S2=−L2+L3+S2+S3
Candidate rejected.
Generated candidate by substituting: S2=S1+S3
Candidate rejected.
Generated candidate by substituting: S2=L1−L2+S3
Candidate rejected.
Generated candidate by substituting: S2=L1−L3
Candidate rejected.
Generated candidate by substituting: S2=L1−L3
Candidate rejected.
Generated candidate by substituting: S2=L1−L2+S3
Candidate rejected.
Generated candidate by substituting: S2=L1−L3
Candidate rejected.
Generated candidate by substituting: S2=L2−L3+S1
Candidate rejected.
Generated candidate by substituting: S2=S1+S3
Candidate rejected.
Generated candidate by substituting: S2=−L1+L2+S1+S2
Candidate rejected.
Generated candidate by substituting: S2=S1+S3
Candidate rejected.
Generated candidate by substituting: S2=L2−L3+S1
Candidate rejected.
Generated candidate by substituting: S2=L1−L3
Candidate rejected.
Generated candidate by substituting: S2=L2−L3+S1
Candidate rejected.
Generated candidate by substituting: S2=L1−L2+S3
Candidate rejected.
Generated candidate by substituting: S2=S1+S3
Candidate rejected.
Generated candidate by substituting: S2=L2−L3+S1
Candidate rejected.
Generated candidate by substituting: S2=S1+S3
Candidate rejected.
Generated candidate by substituting: S3=−L1+L2+S2
Candidate rejected.
Generated candidate by substituting: S3=−S1+S2
Candidate rejected.
Generated candidate by substituting: S3=L2−L3
Candidate rejected.
Generated candidate by substituting: S3=−S1+S2
Candidate rejected.
Generated candidate by substituting: S3=−L1+L2+S2
Candidate rejected.
Generated candidate by substituting: S3=−L1+L3+S2+S3
Candidate rejected.
Generated candidate by substituting: S3=L2−L3
Candidate rejected.
Generated candidate by substituting: S3=−L1+L2+S2
Candidate rejected.
Generated candidate by substituting: S3=L1−L3−S1
Candidate rejected.
Generated candidate by substituting: S3=L2−L3
Candidate rejected.
Generated candidate by substituting: S3=−S1+S2
Candidate rejected.
Generated candidate by substituting: S3=−S1+S2
Candidate rejected.
Generated candidate by substituting: S3=L1−L2−S1+S3
Candidate rejected.
Generated candidate by substituting: S3=L1−L3−S1
Candidate rejected.
Generated candidate by substituting: S3=L2−L3
Candidate rejected.
Generated candidate by substituting: S3=L1−L3−S1
Candidate rejected.
Generated candidate by substituting: S3=−L1+L2+S2
Candidate rejected.
Generated candidate by substituting: S3=−S1+S2
Candidate rejected.
Generated candidate by substituting: S3=L1−L3−S1
Candidate rejected.
Generated candidate by substituting: S3=−S1+S2
Candidate rejected.
Generated candidate by solving: L2=L1−S2+S3
Candidate rejected.
Generated candidate by solving: S2=L1−L2+S3
Candidate rejected.
Generated candidate by solving: S3=−L1+L2+S2
Candidate rejected.
Generated candidate by solving: L3=L1−S1−S3
Candidate rejected.
Generated candidate by solving: S1=L1−L3−S3
Candidate rejected.
Generated candidate by solving: S3=L1−L3−S1
Candidate rejected.
Generated candidate by solving: L1=L2+S2−S3
Candidate rejected.
Generated candidate by solving: S2=L1−L2+S3
Candidate rejected.
Generated candidate by solving: S3=−L1+L2+S2
Candidate rejected.
Generated candidate by solving: L3=L2+S1−S2
Candidate rejected.
Generated candidate by solving: S1=−L2+L3+S2
Candidate rejected.
Generated candidate by solving: S2=L2−L3+S1
Candidate rejected.
Generated candidate by solving: L1=L3+S1+S3
Candidate rejected.
Generated candidate by solving: S1=L1−L3−S3
Candidate rejected.
Generated candidate by solving: S3=L1−L3−S1
Candidate rejected.
Generated candidate by solving: L2=L3−S1+S2
Candidate rejected.
Generated candidate by solving: S1=−L2+L3+S2
Candidate rejected.
Generated candidate by solving: S2=L2−L3+S1
Candidate rejected.
Generated candidate by solving: L1=L3+S1+S3
Candidate rejected.
Generated candidate by solving: L3=L1−S1−S3
Candidate rejected.
Generated candidate by solving: S3=L1−L3−S1
Candidate rejected.

Generated candidate by solving: L2=L3−S1+S2
Candidate rejected.
Generated candidate by solving: L3=L2+S1−S2
Candidate rejected.
Generated candidate by solving: S2=L2−L3+S1
Candidate rejected.
Generated candidate by solving: S2=S1+S3
Candidate rejected.
Generated candidate by solving: S3=−S1+S2
Candidate rejected.
Generated candidate by solving: L1=L2+S2−S3
Candidate rejected.
Generated candidate by solving: L2=L1−S2+S3
Candidate rejected.
Generated candidate by solving: S3=−L1+L2+S2
Candidate rejected.
Generated candidate by solving: L2=L3−S1+S2
Candidate rejected.
Generated candidate by solving: L3=L2+S1−S2
Candidate rejected.
Generated candidate by solving: S1=−L2+L3+S2
Candidate rejected.
Generated candidate by solving: S1=S2−S3
Candidate rejected.
Generated candidate by solving: S3=−S1+S2
Candidate rejected.
Generated candidate by solving: L1=L2+S2−S3
Candidate rejected.
Generated candidate by solving: L2=L1−S2+S3
Candidate rejected.
Generated candidate by solving: S2=L1−L2+S3
Candidate rejected.
Generated candidate by solving: L1=L3+S1+S3
Candidate rejected.
Generated candidate by solving: L3=L1−S1−S3
Candidate rejected.
Generated candidate by solving: S1=L1−L3−S3
Candidate rejected.
Generated candidate by solving: S1=S2−S3
Candidate rejected.
Generated candidate by solving: S2=S1+S3
Candidate rejected.

| Generated Strategies |
| --- |
| { <br> L1 = L2 + S1 <br> L1 = L2 + S2 − S3 <br> L1 = L3 + S1 + S3 <br> L1 = L3 + S2 <br> L2 = L1 − S1 <br> L2 = L1 − S2 + S3 <br> L2 = L3 − S1 + S2 <br> L2 = L3 + S3 <br> L3 = L1 − S1 − S3 <br> L3 = L1 − S2 <br> L3 = L2 + S1 − S2 <br> L3 = L2 − S3 <br> S1 = L1 − L3 − S3 <br> S1 = −L2 + L3 + S2 <br> S1 = S2 − S3 <br> S2 = L1 − L2 + S3 <br> S2 = L2 − L3 + S1 <br> S2 = S1 + S3 <br> S3 = −L1 + L2 + S2 <br> S3 = L1 − L3 − S1 <br> S3 = −S1 + S2 <br> } |

What is claimed is:

1. A method including:
iteratively generating by a computing device a plurality of combination vectors based on at least two vectors of a plurality of available vectors using vector substitution, wherein the plurality of available vectors includes a plurality of identity vectors, one or more definition vectors, and previously generated combination vectors, wherein each identity vector represents a different tradeable object of a plurality of tradeable objects, wherein the plurality of tradeable objects includes one or more strategy markets, wherein each of the one or more strategy markets includes two or more tradeable objects of the plurality of tradeable objects, wherein each identity vector is of a dimension equal to a number of tradeable objects in the plurality of tradeable objects, wherein each definition vector represents one of the one or more strategy markets, wherein each definition vector is of a dimension equal to the number of tradeable objects in the plurality of tradeable objects, wherein each of the plurality of combination vectors represents an independent market combination for one of the tradeable objects in the plurality of tradeable objects;
determining by the computing device implied market information using the plurality of combination vectors, wherein the implied market information includes implied order prices for one or more of the plurality of tradeable objects; and
providing by the computing device the implied market information to a second computing device.

2. The method of claim 1, wherein the plurality of tradeable objects includes a first tradeable object and a second tradeable object, wherein the first tradeable object is at a different exchange than the second tradeable object.

3. The method of claim 1, wherein the one or more strategy markets are spread markets.

4. The method of claim 1, wherein at least one of the plurality of tradeable objects is synthetic.

5. The method of claim 1, wherein iteratively generating the plurality of combination vectors continues for a predetermined number of iterations.

6. The method of claim 1, wherein iteratively generating the plurality of combination vectors continues until no new combination vectors are generated.

7. The method of claim 1, wherein the implied market information is determined using a linear optimization method.

8. The method of claim 1, wherein the implied order prices for the one or more plurality of tradeable objects include inside market prices.

9. The method of claim 1, wherein the computing device includes an electronic exchange.

10. The method of claim 1, wherein the computing device includes a server.

11. The method of claim 1, wherein the computing device includes a gateway.

12. The method of claim 1, wherein the computing device includes a client device.

13. The method of claim 12, wherein the second computing device also includes the client device, wherein providing the implied market information includes providing the implied market information from a first application component to a second application component.

14. The method of claim 1, wherein the second computing device is a client device.

15. The method of claim 14, wherein the implied market information is displayed by the client device.

16. The method of claim 1, wherein the implied market information includes implied order quantities corresponding to the implied order prices.

17. The method of claim 1, further including:
receiving by the computing device new market data related to at least one of the plurality of tradeable objects;
determining by the computing device updated implied market information using the plurality of combination vectors and the new market data; and
providing by the computing device the updated implied market information to the second computing device.

18. The method of claim 1, further including:
receiving by the computing device a notification of a new tradeable object, wherein the new tradeable object is not included in the plurality of tradeable objects, wherein the new tradeable object is related to at least one of the tradeable objects in the plurality of tradeable objects;
adding by the computing device the new tradeable object to the plurality of tradeable objects to create a new plurality of tradeable objects; and
determining by the computing device new implied market information using a new plurality of combination vectors generated based on the new plurality of tradeable objects.

19. The method of claim 1, further including:
receiving by the computing device a notification that a first tradeable object in the plurality of tradeable objects is no longer available;
removing by the computing device the first tradeable object from the plurality of tradeable objects to create a new plurality of tradeable objects; and
determining by the computing device new implied market information using a new plurality of combination vectors generated based on the new plurality of tradeable objects.

* * * * *